Sept. 6, 1927.  1,641,444
C. W. LEE
ROLLING AND MOTOR PROPELLED JACK
Filed Aug. 26, 1924  2 Sheets-Sheet 1
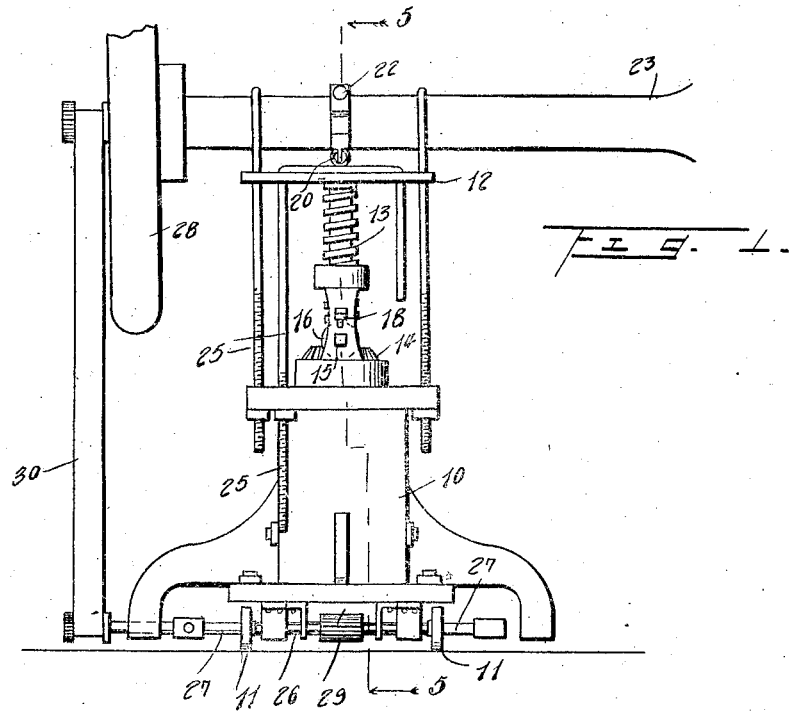
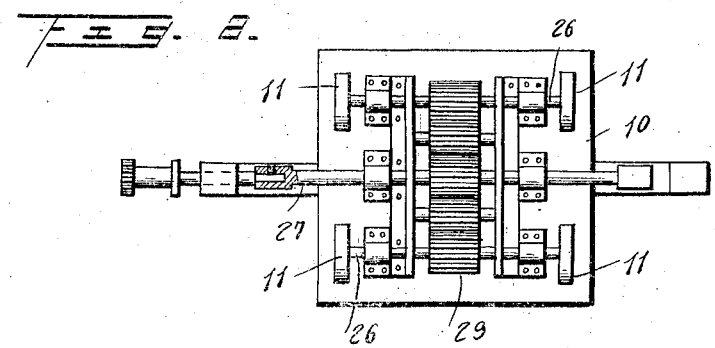
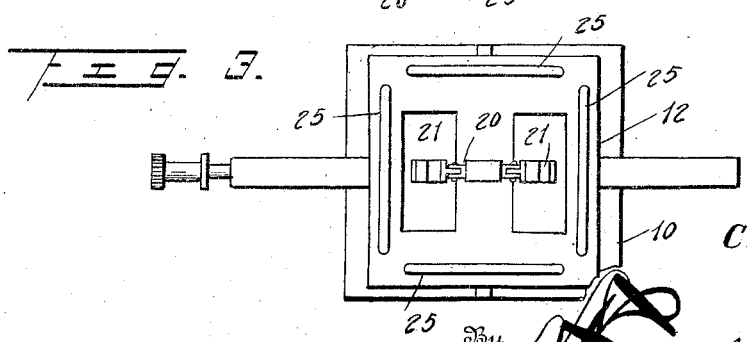
Inventor
C. W. Lee Sept. 6, 1927.   1,641,444
C. W. LEE
ROLLING AND MOTOR PROPELLED JACK
Filed Aug. 26, 1924   2 Sheets-Sheet 2
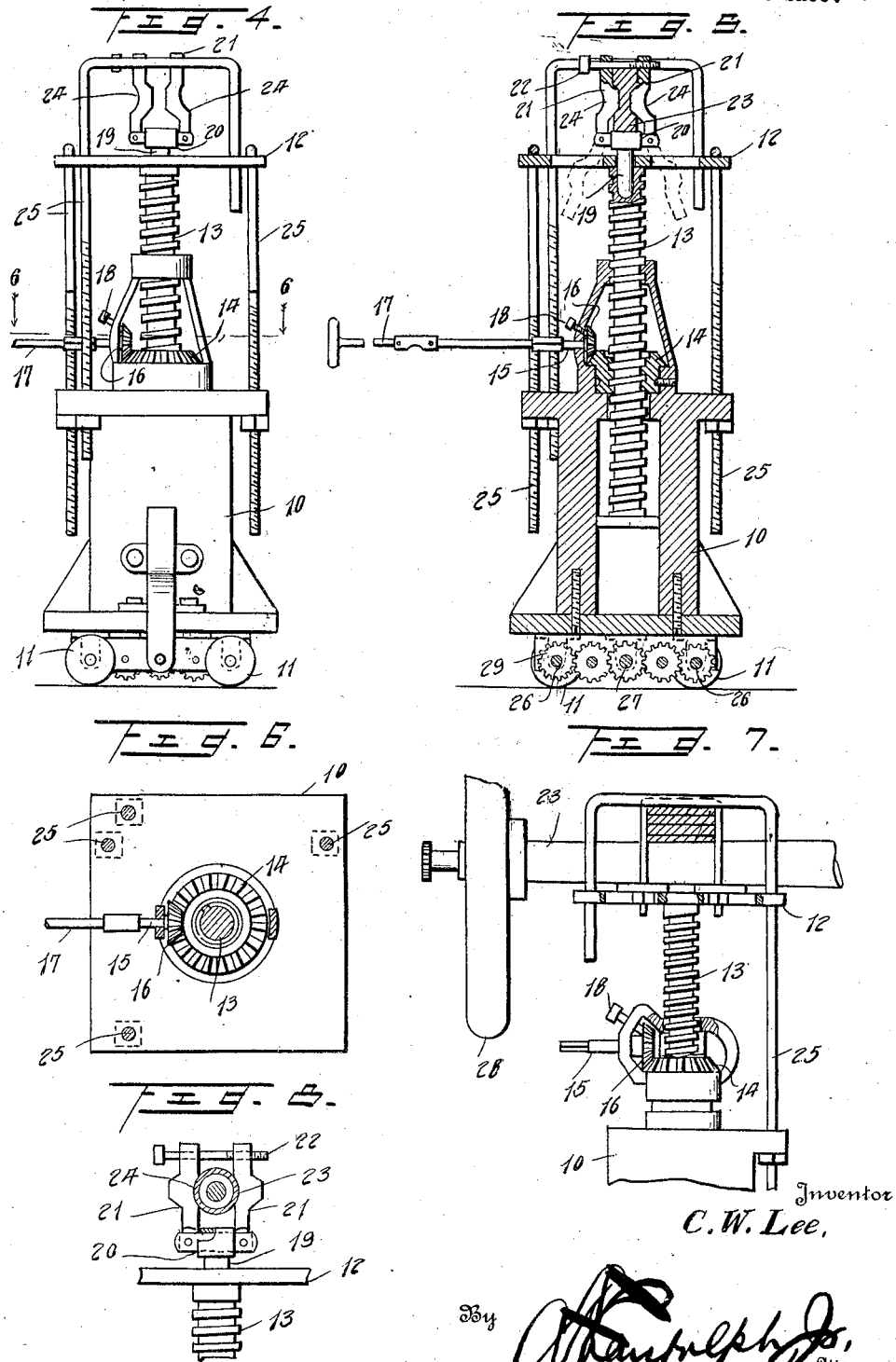

Patented Sept. 6, 1927.

1,641,444

UNITED STATES PATENT OFFICE.

CONNIE W. LEE, OF PADUCAH, KENTUCKY.

ROLLING AND MOTOR PROPELLED JACK.

Application filed August 26, 1924. Serial No. 734,304.

The present invention relates to a jack designed chiefly for use in connection with vehicles equipped with pneumatic tires whereby in the event of a blow-out or other serious injury to a tire, the wheel equipped with the deflated tire may be raised and supported during the travel of the vehicle to a determinate point for proper repairs, and in this manner the tire is prevented from further injury and the vehicle enabled to travel to a point where proper repairs may be made in the event repairs may be lacking and cannot be properly made at the time the tire becomes disabled thereby saving time and energy and obviating further injury to the disabled tire.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is an elevational view of a vehicle jack embodying the invention, showing the same in operative position, Figure 2 is a view of the jack as seen from the lower end, Figure 3 is a top plan view of the jack, Figure 4 is a side view of the jack, Figure 5 is a vertical central sectional view of the jack, the dotted lines showing the reversible clamp members thrown outward and downward, Figure 6 is a sectional view on the line 6—6 of Figure 4, Figure 7 is a detail view of the upper portion of the jack showing the same attached to the rear axle and spring of a vehicle, and Figure 8 is a detail view showing the jack clamped to the rear axle housing.

Corresponding and like parts are referred to in the following description and designated in the several views of the drawings by like reference characters.

The jack comprises a suitable base 10 which is mounted upon suitable rolling supports 11 and this base and the rolling supports therefor may vary according to the size and particular design of the jack. A rest 12 for sustaining the load is adjustably connected with the base 10 whereby to be moved vertically for raising or lowering the part to which the jack is applied when in service. Any suitable elevating means common in devices of this nature may be employed for adjustably connecting the rest 12 to the base 10 and as shown a lifting screw 13 is mounted in the base 10 and receives the rest 12, a nut 14 coacting with the lifting screw and mounted upon the base by means of a swivel joint, rotation of said nut serving to move the lifting screw up or down as required in a manner well understood. A shaft 15 mounted upon the base 10 is provided at its inner end with a gear wheel 16 which is in mesh with cog teeth forming a part of the nut 14 and the shaft 15 may be rotated in any preferred way, and as shown, an extension shaft 17 is adapted to be coupled thereto when the device is in service. When the jack is not in use the extension shaft 17 is disconnected from the shaft 15 and conveniently stowed so as not to be in the way or occupy valuable space. The operating mechanism may be locked in any adjusted position by means of a screw 18 threaded into an extension of the base 10 and coacting with the gear 16.

Means are provided for securing the jack to the vehicle, and as shown these means coact with the rest 12 and lifting screw 13. A pin 19 loosely fitted in the rest 12 and lifting screw 13 receives a cross piece 20 to the ends of which are pivoted reversible clamp members 21 which are drawn together by means of a clamp screw 22. The cross piece 20 is rotatably mounted in the head of the pin 19 to admit of reversing the clamp members 21. The clamp members 21 are constructed to engage the front axle 23 of a vehicle or the rear axle housing 24 as shown most clearly in Figures 5 and 8 respectively.

Clamp members 25 four in number are fitted to the rest 12 and base 10, each of said members being substantially of hook form and having the long leg engaging the rest 12 and a flange of the base 10 and having the short leg engaging the rest 12 wholly. These clamp members supplement the action of the clamp members 21 in securing the jack to the axle and springs of a vehicle as shown most clearly in Figures 1 and 7 respectively.

The rolling supports 11 may be of any preferred construction and arrangement and may be mounted to rotate freely or to be positively driven accordingly as the jack is applied to a front wheel or a rear wheel of a motor vehicle. As shown, the rotary supports 11 are fast to the outer ends of axles 26 and these axles are geared to a shaft 27 which is adapted to be connected to the hub of a rear wheel 28. A train of gearing 29 connects the axles 26 with the shaft 27 and a drive belt 30 connects the shaft 27 with the drive wheel 28 whereby the rotary supports 11 may be positively driven when the jack is applied to the rear axle.

What is claimed is:—

1. A motor vehicle jack, including a base, a shaft journaled on said base, rollers supporting the base and secured for rotation with the shaft, another shaft journaled on the base, a train of gears connecting the shafts to rotate them in the same direction, the last mentioned shaft being adapted to be driven from an axle shaft of a vehicle.

2. A motor vehicle jack, comprising a base, means supported by said base to engage a vehicle axle housing and lift it, a shaft journaled on said base, rollers supporting the base and secured for rotation with the shaft, another shaft journaled on the base, a pulley secured to the last mentioned shaft and adapted to be geared to the axle shaft of the vehicle, a gear pinion secured to each shaft, and an idle pinion meshing with said gear pinions.

In testimony whereof I affix my signature.

CONNIE W. LEE.